(12) United States Patent
Cei et al.

(10) Patent No.: US 7,693,732 B2
(45) Date of Patent: Apr. 6, 2010

(54) LAB RESERVATION SYSTEM

(75) Inventors: Stefano Cei, Cupertino, CA (US);
Gregory Collins, Pacifica, CA (US);
Krishna Nekkalapudi, Cupertino, CA (US); Ranga Polisetti, Union City, CA (US); Daryl Porter, Danville, CA (US);
David Yee, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1048 days.

(21) Appl. No.: 10/180,747

(22) Filed: Jun. 25, 2002

(65) Prior Publication Data

US 2009/0070174 A1    Mar. 12, 2009

(51) Int. Cl.
*G06Q 10/00*    (2006.01)
(52) U.S. Cl. .......................................................... 705/5
(58) Field of Classification Search ........................ None
See application file for complete search history.

(56) References Cited

U.S. PATENT DOCUMENTS 7,117,351 B2 *  10/2006  O'Connor ...................... 713/2
2002/0124245 A1 *  9/2002  Maddux et al. ............. 717/176

OTHER PUBLICATIONS

University of Illinois, Chicago ACCC Public Lab Reservation, http://web.archive.org/web/20011119004249/http://www.uic.edu/depts/accc/pclabs/roomres.html, Oct. 6, 2000.*
University of Michigan Business School, http://www.bus.umich.edu/technology/CoreKnowledge/FacultyCore/Modules/Classrooms.htm, May 1, 2002.*

* cited by examiner

*Primary Examiner*—John W Hayes
*Assistant Examiner*—Rob Wu
(74) *Attorney, Agent, or Firm*—Townsend and Townsend and Crew LLP

(57) ABSTRACT

The present invention provides a computer implemented lab reservation system including a reservation engine and a reservation database. The reservation database contains data concerning the computer systems and target operating environments in the lab. The reservation engine manipulates the reservation database in order to efficiently match user requests to specific lab computer systems and target operating environments. The reservation system also manipulates the reservation database in order to efficiently configure computer systems and target operating environments. The reservation engine also manipulates the reservation database in order to efficiently reinstall computer system default settings, when users return configured systems, so that the computer systems can be reallocated to new requests.

20 Claims, 6 Drawing Sheets

LAB RESERVATION SYSTEM

FIELD OF THE INVENTION

Embodiments of the present invention relate to the field of computer systems, and more particularly to managing the allocation and configuration of computer systems.

BACKGROUND OF THE INVENTION

Software application developers (herein referred to as developers and users) regularly need various hardware and software configurations to test their applications on. The hardware and software must be made available quick and under known and consistently built configurations. The developers need various computer systems with various operating systems, various application programs, and/or various drivers loaded on the computers (software and/or target operating environment is herein used to refer to operating systems, application programs, drivers and combinations thereof).

In some instances, developers may purchase hardware and software for their individual testing needs. The developers then install the software on the test hardware. However, this regularly results in a multiplicity of costs and a high likelihood for inconsistently configured hardware.

Alternatively, organizations may centralize the hardware and software into computer labs that are administered by lab administrators. Centralization conserves resources such as computers, software, office space, and the like. The lab administrators configure and provide the requested test configurations to the software application developers. For example, an application developer may need to test his/her application on a Windows NT system with service pack 6 against a midtier machine set up on Solaris with Oracle 9iAS v2.0.4 and against a database machine set up with Oracle 8.1.7 on patchset 2. Provisioning of such hardware configured with the software should be quick and predictable.

Typically, software installation is done by hand using the operating system and/or application program vendor's install procedures. Such method can take hours or even days to complete depending upon the number of machines, the operating systems, and the application programs. This method also requires a high degree of knowledge, skill and training, otherwise risking inconsistently setup hardware.

Alternatively, a backup, made to tape or other media, of an operating system install and/or application install may be utilized to setup computers. However, the method also requires a high degree of knowledge, skill and training. Furthermore, although typically faster then the above install method, restoring the computers is also time consuming.

SUMMARY OF THE INVENTION

The present invention automates the process of configuring various computers with various target operation environments. The present invention allows an untrained user to select the desired hardware and software configurations needed. The present invention also provides an automated reservation and scheduling system for a lab of shared computers.

The present invention stores a description of each computer in a reservation database. The present invention also stores an image of each target operation environment in the reservation database. The present invention also cross-references the permissible target operation environments that can be loaded on each computer system.

Utilizing the information contained in the reservation database, the present invention provides a user with a list of computer systems and target operating environments in the lab. The present invention also receives one or more requests from users. For each request, the present invention checks for an available computer system matching the request. The present invention also causes the matching available computer system to be configured with the requested operation environment and allocates the configured system to the requesting user.

The present invention also provides a lab administrator information necessary to load an image file (the requested target operating environment) on requested computer systems, in response to various user requests. The present invention also provides the lab administrator information necessary to reinstall computer system settings upon return of the systems from the users, such that the computer systems can be efficiently reallocated to new requests.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The present invention provides an application developer with a user interface to request lab hardware and to request it to be configured according to known images of target operating environments. The present invention also provides a lab administrator a user interface containing all the information necessary to efficiently configure the lab hardware with target operating environments in accordance with developer's request.

Figure 1:
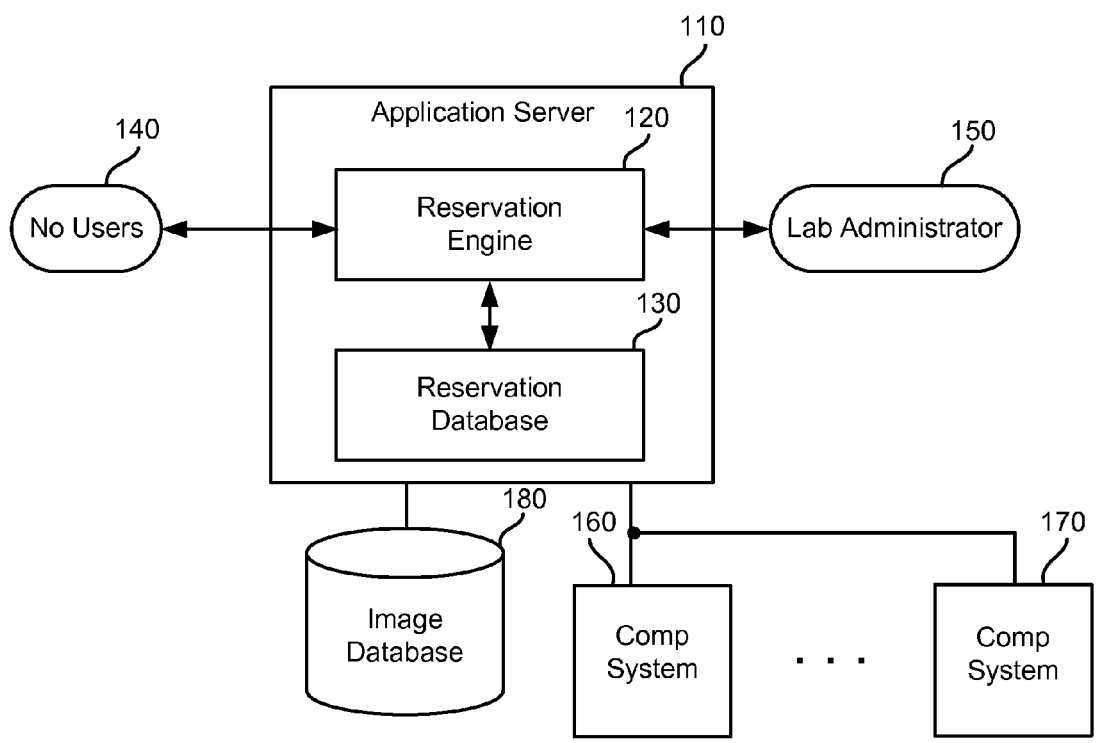
FIG. 1 shows an application server in accordance with one embodiment of the present invention.

Referring now to FIG. 1, an application server (herein also referred to as a lab reservation system) 110 in accordance with one embodiment of the present invention is shown. As depicted in FIG. 1, the lab reservation system 110 includes a reservation engine 120 communicatively coupled to a reservation database 130. Users 140 and a lab administrator 150 are also communicatively coupled to the reservation engine 120.

The reservation engine 120 queries the reservation database 130 and provides the users with a list of available configurations. A configuration corresponds to a particular combination of computer system and target operation environment. The reservation engine 120 also receives requests from the users 140. The reservation engine 120 then updates the reservation database 130 in accordance with each user 140 request.

The reservation engine 120 also queries the reservation database 130 and provides the lab administrator 150 with a list of computer systems to be configured (i.e. installed). The reservation engine 120 also queries the reservation database 130 and provides the lab administrator 150 with a list of computer systems to be cleaned up (i.e. restored). The reservation engine 120 then updates the reservation database 130 in accordance with the install and restore actions taken by the lab administrator 150.

The application sever 110 may also be connected to an image database 180 and one or more computer systems 160, 170. As a result, in an alternative feature of the present embodiment, the application server 110 also provides for installing a target operating environment, contained as an image in the image database 180, on one or more computer systems 160, 170. Storing a target operating environment as an image allows for easy and efficient installation of the target operating environment on the computer systems 160, 170. Additionally, storing a target operating environment as an image allows for the storage of multiple target operation environments in the image database 180. The application server 110 automates the installation process, thus eliminating manual installation of target operation environments by the lab administrator. A method for automating the installation process is described in applicants' pending U.S. patent application entitled "A Method and System for Restoring an Operating Environment on a Computer System," incorporated herein by reference.

Thus the same target operating environments and computer systems can be reused for different configurations. The application server 110 also provides for rapid configuration and recast of clusters of computer systems.

Figure 2:
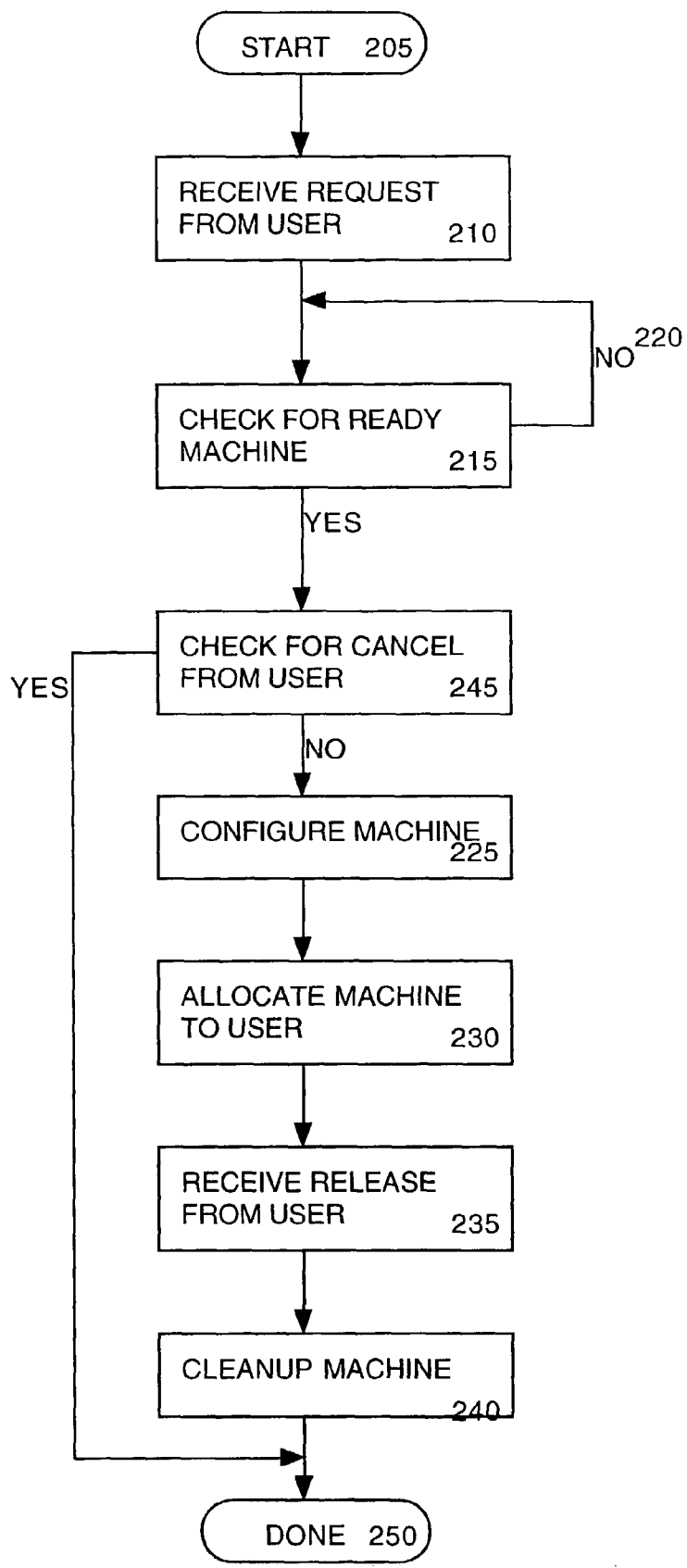
FIG. 2 shows a flow diagram of a process performed by a lab reservation system in accordance with one embodiment of the present invention.

Referring now to FIG. 2, a flow diagram of a process performed by a lab reservation system in accordance with one embodiment of the present invention is shown. As depicted in FIG. 2, the process begins with the receipt of a request from a user, at step 210. The system then checks for a machine that is ready to service the request, at step 215. If a machine is not currently ready to service the request, the system periodically re-checks for a ready machine 220. If a machine is ready for servicing the request, the system causes the machine to be configured with the requested software, by a lab administrator, at step 225. Once the machine has been configured, the machine is allocated to the user, at step 230. The system then waits until it receives a release from the user indicating that the user is done utilizing the machine, at step 235. Upon receipt of the release, the system causes the machine to be cleaned up (i.e. the requested software is removed from the machine and the machine's default settings restored), by the lab administrator, at step 240. Once the machine has been cleaned up 240, the request has been fully served, and the process is done 250 for the particular request.

The lab reservation system is capable of performing the above process repeatedly for numerous requests, for various machines, and various software installations. Furthermore, in an alternative feature of the present embodiment, the system checks for a users instruction to cancel the request, at step 245. A request can be canceled prior to configuration of the machine 225. If a request is canceled, the process is done 250, the machine is not allocated to the user, and there is no need to clean up the machine.

Figure 3:
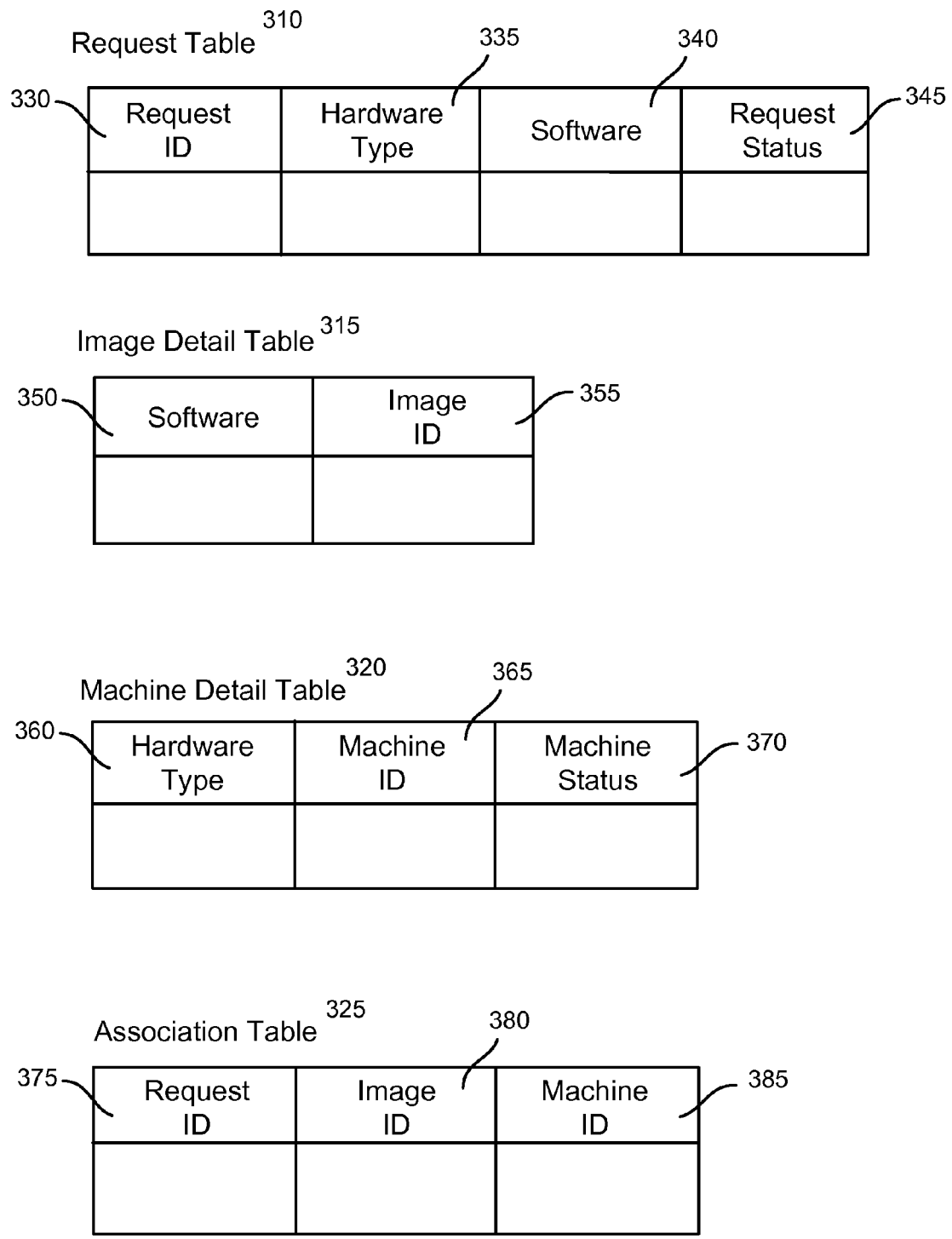
FIG. 3 shows a reservation database for use in a lab reservation system in accordance with one embodiment of the present invention.

Referring now to FIG. 3, a reservation database for use in a lab reservation system in accordance with one embodiment of the present invention is shown. As depicted in FIG. 3, the reservation database comprises a request table 310, an image detail table 315, a machine detail table 320, and an association table 325.

The request table 310 is used for storing detail concerning user requests. Each user request is represented by a record in the request table 310. The request table includes a request_id field 330, a hardware_type field 335, a software field 340, and a request_status field 345. The request_id field 330 uniquely identifies each request. The hardware_type field 335 specifies the requested machine type. The software field 340 specifies the requested software. The request_status field 345 indicates the current status of the request. Valid values in the request_status field include "in queue", "being served", "served", "cancelled", and "completed".

The image detail table 315 is used to store detail concerning software. Each software image is represented by a record in the image detail table 315. The image table 315 includes a software field 350 and an image_id field 355. The software field 350 contains each software available to the user (e.g. Window operation system, Unix operation system, Oracle database application, and the like). The image_id field 355 uniquely identifies the image of the corresponding software.

The machine detail table 320 is used to store detail concerning hardware. Each individual machine is represented by a record in the machine detail table 320. The machine detail table includes a hardware_type field 360, a machine_id field 365, and a machine_status field 370. The hardware_type field 365 contains each machine type available to the user (e.g. Intel-based PC, Sun Workstation, and the like). The machine_id field 365 uniquely identifies each individual machine. The machine_status field 370 indicates whether the machine is available or not. Valid values in the machine_status field 370 include "ready", "in use", "cleanup" and "to be setup".

The association table 325 is used to associate a given request with an appropriate individual machine and the image of the requested software. The association table 325 includes a request_id field 375, an image_id field 380, and a machine_id field 385. The request_id field 375 contains the unique identifier for the corresponding request. The image_id field 380 contains the unique identifier of the image for the corresponding requested software. The machine_id field 385 contains the unique identifier of the individual machine for the corresponding requested machine.

For a given request, the hardware_type 335 value is used to map the request to an applicable machine_id 365 value, via the hardware_type field 360, in the machine detail table 320. Likewise, the software 340 value of the request is used to map the request to an applicable image_id 355 value, via the software_field 350, in the image detail table 315. If the machine status 370 value, for the applicable machine_id 365 value, is "ready" then a record containing the request_id 330 value from the request table 310, the image_id 355 value from the image detail table 315, and the machine_id 365 value from the machine detail table 320, is entered in the association table 325. The corresponding machine_status 370 value in the machine detail table 320 and the request_status 345 value in the request table 310 are updated to "to be setup" and "being serviced" respectively.

A lab administrator may query the machine detail table 320 to determine which machines need to be configured (i.e. machine_status 370 of "to be setup"). The corresponding machine_id 365 value in the machine table 320 is compared against the corresponding machine_id 385 value in the association table 325. The corresponding record in the association table 325 provides the lab administrator with the particular machine to be configured and the software image to be loaded, along with the request_id 375 identifying the requesting user. Upon configuration, the lab administrator causes the machine_status 370 for the corresponding record in the machine detail table 320 to be changed to "in use". The "in use" machine_status 370 causes the request_status 345 for the corresponding record in the request table 310 to be changed to "served".

When the user is done utilizing the machine, the user causes the request_status 345 for the corresponding record in the request table 310 to be changed to "completed". The completed request_status 345 causes the machine_status 370 for the corresponding record in the machine detail table 320 to be changed to "clean up". Thereafter, the corresponding record in the association table 325 and reservation table 310 may be deleted.

The lab administrator may also query the machine detail table 320 to determine which machines need to be restored to the default configuration (i.e. machine_status 370 of "clean up"). Upon restoration of the particular machine's default settings, the corresponding machine_status 370 in the machine detail table 320 may then be set to "ready".

Those skilled in the art will appreciate that the above description of the reservation database is presented to illustrate the concept of the invention. Those skilled in the art will also appreciate that the number of tables and organization of the tables will vary in a commercial embodiment to achieve optimal performance of the present invention.

Figure 4:
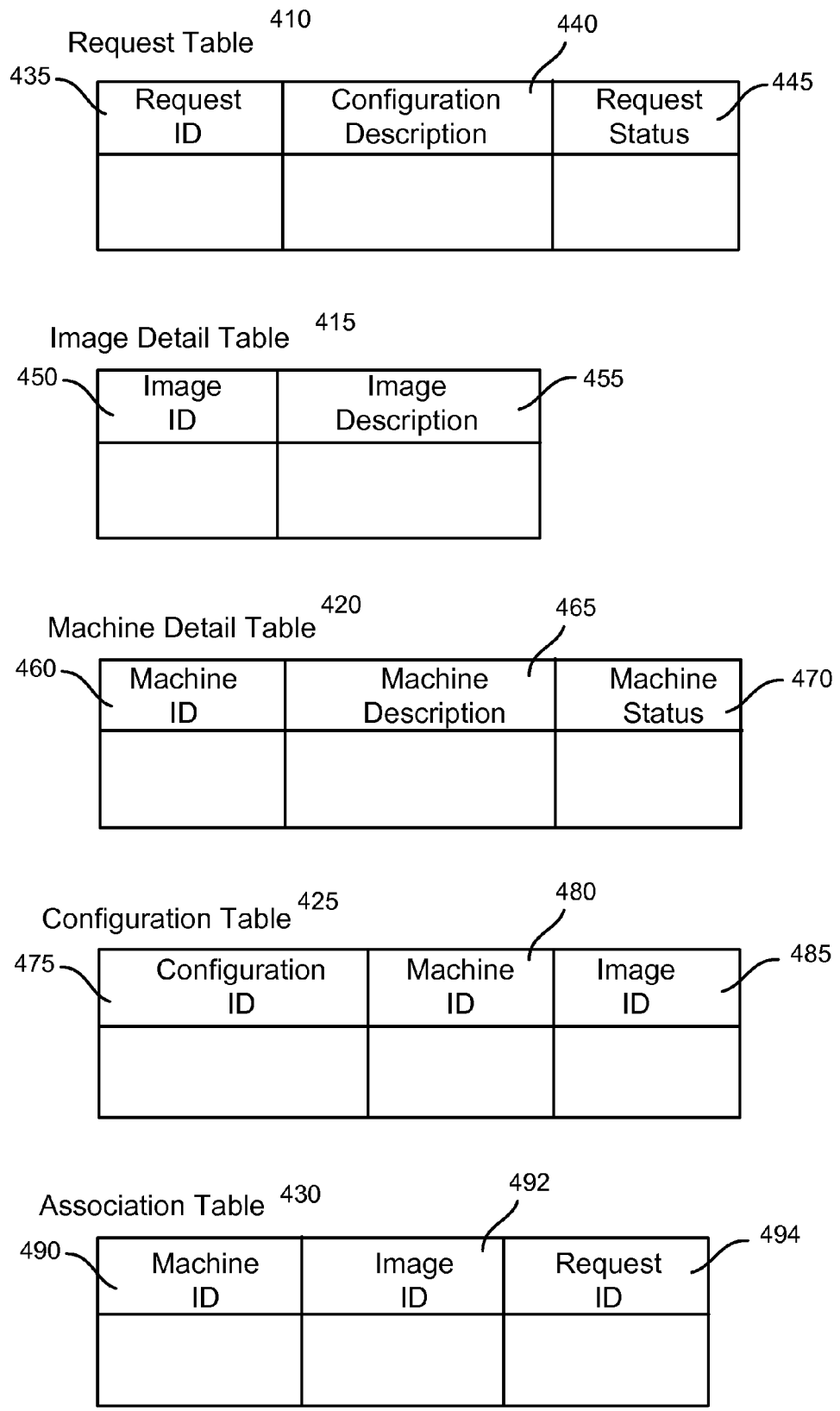
FIG. 4 shows a reservation database for use in a lab reservation system in accordance with another embodiment of the present invention.

Referring now to FIG. 4, a reservation database for use in a lab reservation system in accordance with another embodiment of the present invention is shown. As depicted in FIG. 4, the reservation database comprises a request table 410, an image detail table 415, a machine detail table 420, a configuration table 425, and an association table 430.

The request table 410 is used for storing detail concerning user requests. Each user request is represented by a record in the request table 410. The request table 410 includes a request_id field 435, a configuration_description field 440, and a request_status field 445. The request_id field 435 uniquely identifies each request. The configuration_description field 440 specifies the requested configuration of software and hardware. The request_status field 445 indicates the current status of the request for use by the requesting user. Valid values in the request_status field 445 include "in queue", "being served", "served", "cancelled", and "completed".

The image detail table 415 is used to store detail concerning software. Each software image is represented by a record in the image detail table 415. The image detail table includes a image_id field 450 and an image_description field 455. The image_description field 455 contains each software available to the user (e.g. Window operation system, Unix operation system, Oracle database application, and the like). The image_id field 450 uniquely identifies the image of the corresponding software.

The machine detail table 420 is used to store detail concerning the hardware. Each individual machine is represented by a record in the machine detail table 420. The machine detail table 420 includes a machine_id field 460, a machine_description field 465, and a machine_status field 470. The machine_id field 460 uniquely identifies each individual machine. The machine_description field 465 contains each machine type available to the user (e.g. Intel-based PC, Sun Workstation, and the like). The machine_status field 470 indicates whether the machine is available or not. Valid values in the machine_status field 470 include "ready", "in use", "cleanup" and "to be setup".

The configuration table 425 is used to store details concerning what software can be loaded on what machines. Not all images can be run on all machines. For example, the Mac OS should not be loaded onto a Cisco server, Oracle Database 8.1.7 is ineffective if loaded onto an Intel 386 PC. Therefore, in some implementations the users should only be allowed to select from workable configurations of machines and images. The configuration table 425 includes a configuration_description field 475, a machine_id field 480, and an image_id field 485. The configuration_description field 475 contains the description of available configurations of machines and software. The configuration_description 475 value may be a composite of applicable machine_description 465 values and image_description 455 values. The machine_id field 480 contains the unique individual machine identifier. The image_id field 485 contains the unique image identifier. Each machine is listed for each applicable software image that is capable of being run on the machine. Thus, only certain software is allowed to be used with certain computers.

The association table 430 is used to associate a given request with an appropriate individual machine and the image of the requested software. The associate table includes a request_id field 490, an image_id field 492, and a request_id field 494. The machine_id field 490 contains the unique identifier of the individual machine for the corresponding requested machine. The image_id field 492 contains the unique identifier of the image for the corresponding requested software. The request_id field 494 contains the unique identifier for the corresponding request.

For a given request, the configuration_description 440 value is used to map the request to an applicable machine_ID 480 value and image_ID 485 value in the configuration table 425. The machine_ID 480 value, in the configuration table 425, maps the request to an applicable machine_id 460 value in the machine detail table 420. Similarly, the image_ID 485 value, in the configuration table 425, maps the request to an applicable image_id 450 value in the image detail table 415. If the machine status 470 value, for the applicable machine_id 460 value, is "ready" then a record containing the request_id 435 value from the request table 410, the image_id 450 value from the image detail table 415, and the machine_id 460 value from the machine detail table 420, is entered in the association table 430. The corresponding machine_status 470 value in the machine detail table 420 and the request_status 445 value in the request table 410 are updated to "to be setup" and "being serviced" respectively.

A lab administrator may query the machine detail table 420 to determine which machines need to be configured (i.e. machine_status 470 of "to be setup"). The corresponding machine_id 460 value in the machine table 420 is compared against the corresponding machine_id 490 value in the association table 430. The corresponding record in the association table 430 provides the lab administrator with the particular machine to be configured and the software image to be loaded, along with the request_id 494 identifying the requesting user. Upon configuration, the lab administrator causes the machine_status 470 for the corresponding record in the machine detail table 420 to be changed to "in use". The "in use" machine_status 470 causes the request_status 445 for the corresponding record in the request table 410 to be changed to "served".

When the user is done utilizing the machine, the user causes the request_status 445 for the corresponding record in the request table 410 to be changed to "completed". The completed request_status 445 causes the machine_status 470 for the corresponding record in the machine detail table 420 to be changed to "clean up". Thereafter, the corresponding record in the association table 430 and reservation table 410 may be deleted.

The lab administrator may also query the machine detail table 420 to determine which machines need to be restored to the default configuration (i.e. machine_status 470 of "clean up"). Upon restoration of the particular machine's default settings, the corresponding machine_status 470 in the machine detail table 420 may then be set to "ready".

Those skilled in the art will appreciate that the above description of the reservation database is presented to illustrate the concept of the invention. Those skilled in the art will also appreciate that the number of tables and organization of the tables will vary in a commercial embodiment to achieve optimal performance of the present invention.

Figure 5:
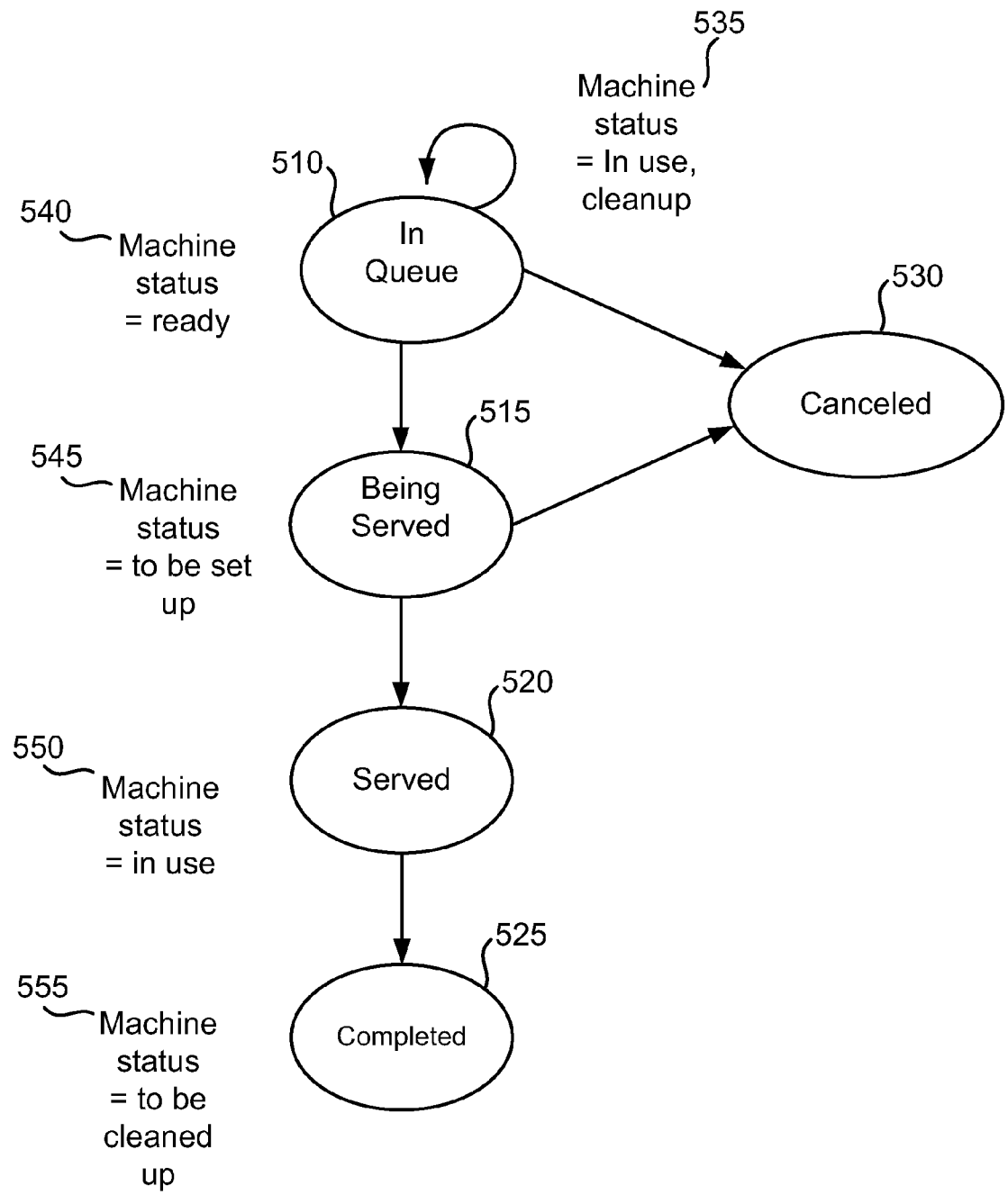
FIG. 5 shows a diagram of the states of a request in accordance with one embodiment of the present invention.

Referring now to FIG. 5, a diagram of the states of a request in accordance with one embodiment of the present invention is shown. As depicted in FIG. 5, the request status has five possible states: "in queue" 510, "being served" 515, "served" 520, "completed" 525, and "cancelled" 530. The "in queue" state 510 is the first state assigned to a user request when entered. If the status of a requested machine or of all the machines matching the requested configuration is either "in use" or "cleanup" 535, the user's request remains in the "in queue" state 510. When the state of a requested machine becomes "ready" 540, the status of the request changes to "being served" 515. The "being served" state 515 indicates that the machine has been allocated to the particular request. The request state of "being served" 515 also corresponds to a machine state of "to be setup" 545. The request status remains in the "being served" state 515 until a lab administrator has loaded the image of the requested software on the requested machine. Once the lab administrator has loaded the image, the state of the user's request is changed to "served" 520. The "served" state 520 indicates that the requested machine is allocated to the user (i.e. can be utilized by the developer). The request state of "served" 520 also corresponds to a machine state of "in use" 550. When the user is done utilizing the requested machine, the state of the request is changed to "completed" 525. The request state of "completed" 525 also corresponds to a machine state of "to be cleaned up" 555.

Furthermore, the request state may also be "cancelled" 530. The "cancelled" state 530 indicates that the user does not want the requested machine. The canceled state is entered from either the "in queue" 510 or "being served" 515 state. The "canceled" state 530 differs from the "completed" state 525 in that a request that has been "cancelled" 530 prior to a machine being "served" 520, does not require that the machine be "cleaned up" 555; while a machine that was "served" 520 and then subsequently "completed" 525, requires that the requested machine be "cleaned up" 555. The state of a particular request therefore terminates in either the "canceled" 530 or "completed" state 525.

Figure 6:
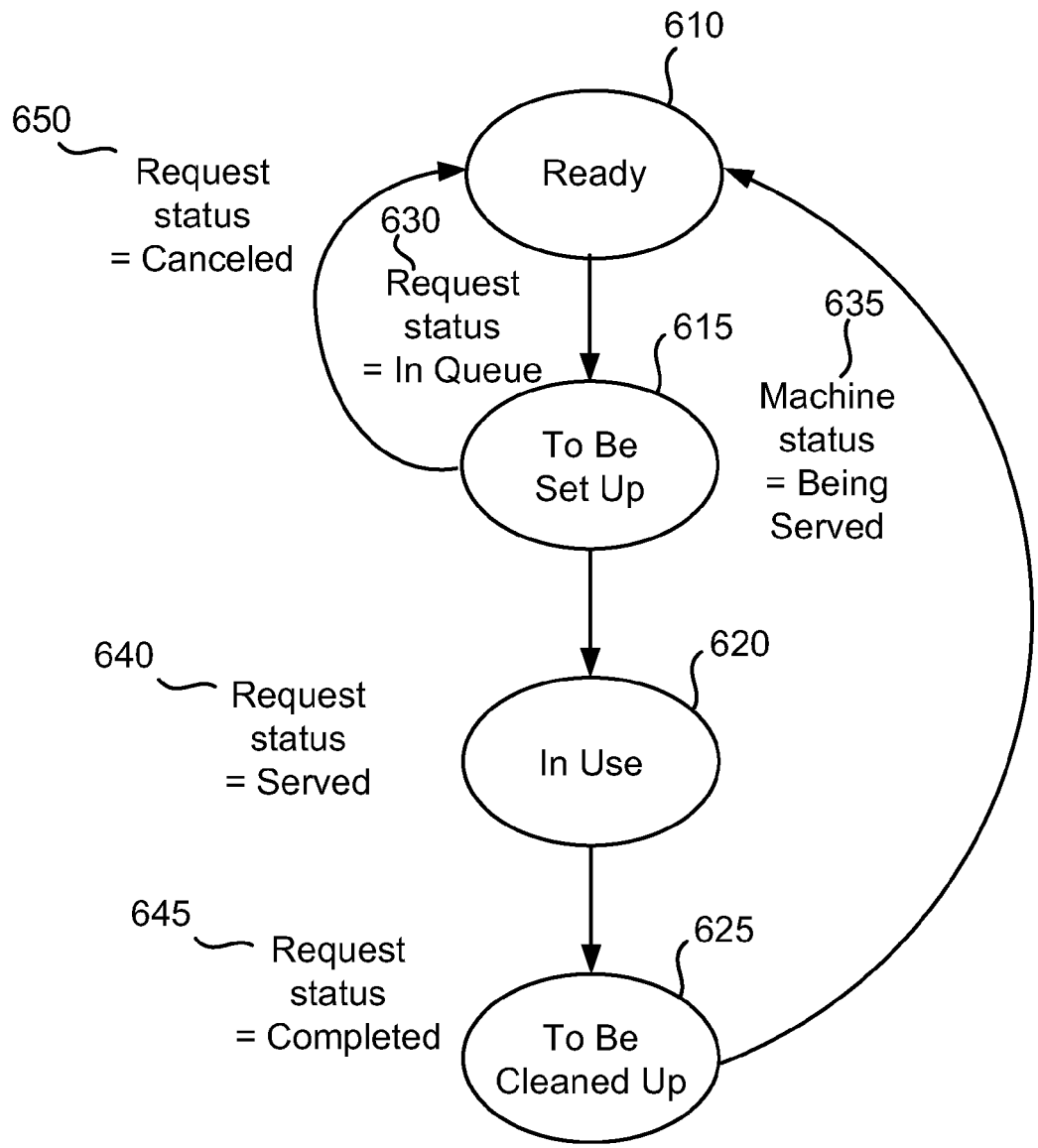
FIG. 6 shows a diagram of the states of a machine in accordance with one embodiment of the present invention.

Referring now to FIG. 6, a diagram of the states of a machine in accordance with one embodiment of the present invention is shown. As depicted in FIG. 6, the machine status has four possible states: "ready" 610, "to be setup" 615, "in use" 620, and "to be cleaned up" 625. Initially the state of a machine is "ready" 610. The state of the machine changes to "to be setup" 615 when the state of a request for the machine is "being served" 635. The "to be setup" state 615 provides notice to a lab administrator to set up a specified machine with the specified image. The "to be setup" state 615 also corresponds to the "being served" state of a request 635. Once the lab administrator has set up the machine with the requested software image, the state of the machine is changed to "in use" 620. The "in use" state 620 indicates that the requesting user may utilize the machine. The "in use" state 620 also corresponds to the "served" state of a request 640. Once the requesting user is done utilizing the machine, indicated by a request status of "completed" 645, the state of the machine becomes "to be cleaned up" 625. The "to be cleaned up" state 625 provides notice to a lab administrator to remove the requested image from the machine and restore the machine to a default configuration. After the image is removed from the machine, the status of the machine is changed to "ready" 610.

Furthermore, the state of a machine may transition from "to be set up" 615 to "ready" 610 when a request for the machine is cancelled 650. The state of a machine, can go from "to be set up" 615 directly to "ready" 610 because an image has not yet been loaded on the machine, and therefore there is no image to be "cleaned up" 625 before returning the machine to the "ready" 610 state.

Those skilled in the art will also appreciate that the above described embodiments of the present invention can readily be configured to provide the following additional features: transferring requests from one user to another, populating the database with the machine details, populating the database with image details, and the like.

From the above-described embodiments, those skilled in the art will also appreciate that the present invention allows configurations of computer systems to be setup by untrained persons, utilizing an image database containing target operating environments. Utilizing the present invention, computer systems can also be made available to other users quickly. Utilizing the present invention, test computers can also be utilized more often with less idle time. Thus, large amounts of money can be saved by sharing a pool of computers with the use of the present invention, rather than purchasing separate computers for each test.

Furthermore, setup and test can be done remotely utilizing an automated process as described in applicants' pending U.S. patent application entitled "A Method and System for Restoring an Operating Environment on a Computer System," incorporated herein by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented process managed by a lab reservation system, the lab including a plurality of machines, comprising:
receiving a request from a user for at least one of the plurality of machines, said request indicating a selected one out of a plurality of different target operating environments stored in a common computing system, and said selected operating environment installable on at least one of the plurality of machines;
storing in a database a plurality of records, wherein, for each machine of said plurality of machines, the database stores information relating to a hardware configuration and status of the machine;
in response to the request:
querying the database to identify a ready machine of said plurality of machines having hardware components in accordance with the selected target operating environment;
updating, in the database, the status for the ready machine in the database to indicate that said ready machine is in use;
configuring the ready machine to match the request by installing the selected target operating environment on the ready machine; and
allocating the configured ready machine to the user.

2. The computer implemented process managed by a lab reservation system according to claim 1, further comprising:
storing, in the database, information relating to available configurations for each of said plurality of machines; and
providing, based at least in part from said information relating to available configurations, the user with details of one or more of said available configurations; and
wherein said request includes a selected configuration from said one or more of said available configurations.

3. The computer implemented process managed by a lab reservation system according to claim 1, wherein the request comprises:
a software application description; and
a machine type description.

4. The computer implemented process managed by a lab reservation system according to claim 1, wherein said configuring the ready machine to match the request comprises:
receiving a notification from the lab reservation system, wherein the notification contains details of the ready machine matching the request and details of an image of a software application matching the request; and
loading the image on the ready machine in response to the notification.

5. The computer implemented process managed by a lab reservation system according to claim 4, wherein configuring the ready machine to match the request is performed by a lab administrator.

6. The computer implemented process managed by a lab reservation system according to claim 4, wherein configuring the ready machine to match the request is performed by an automated process.

7. The computer implemented process managed by a lab reservation system according to claim 1, wherein allocating the configured ready machine to the user comprises:
sending a notification to the user that the request is served.

8. The computer implemented process managed by a lab reservation system according to claim 1, further comprising:
receiving a notification from the user that the allocated ready machine is returned;
updating the status for the ready machine in said database to indicate that said ready machine is being cleaned; and
cleaning up the ready machine in response to the notification.

9. The computer implemented process managed by a lab reservation system according to claim 8, wherein cleaning up the returned ready machine in response to the notification comprises:
receiving a notification from the lab reservation system, wherein the notification contains details concerning the ready machine and details of the software application loaded on the ready machine; and
removing the software application from the ready machine; and
upon completion of said removing, updating the status for the ready machine in the database to indicate that said ready machine is available.

10. The computer implemented process managed by a lab reservation system according to claim 8, wherein cleaning up the returned ready machine is performed by a lab administrator.

11. The computer implemented process managed by a lab reservation system according to claim 8, wherein cleaning up the returned ready machine is performed by an automated process.

12. A computer-readable storage medium having stored thereon instructions for causing at least one processor to perform a method, the computer-readable storage medium including:
instructions that cause said at least one processor to receive a request from a user for at least one of the plurality of machines, said request indicating a selected one out of a plurality of different target operating environments stored in a common computing system, and said selected operating environment;
instructions that cause said at least one processor to store in a database a plurality of records, wherein, for each machine of said plurality of machines, the database stores information relating to a hardware configuration and status of the machine; and
instructions that cause said at least one processor to, in response to the request:
query the database to identify a ready machine of said plurality of machines having hardware components in accordance with the selected target operating environment;
update, in the database, the status for the ready machine in the database to indicate that the ready machine is in use;
configure the ready machine to match the request by installing the selected target operating environment on the ready machine; and
allocate the configured ready machine to the user.

13. The computer-readable storage medium of claim 12, further comprising:
instructions that cause said at least one processor to update the status for the ready machine in said database to indicate, during execution of said instructions that cause said at least one processor to configure the ready machine, that the ready machine is being configured; and
instructions that cause said at least one processor to update the status for the ready machine in the database to indicate, upon completion of said instructions that cause said at least one processor to configure the ready machine, that said execution has been completed.

14. The computer-readable storage medium of claim 12, further comprising:
  instructions that cause said at least one processor to associate each machine of said plurality of machines with a set of software installable on said machine; and
  wherein said instructions that cause said at least one processor to query the database to identify the ready machine include instructions that cause said at least one processor to select said ready machine based on said software associated with said ready machine.

15. The computer-readable storage medium of claim 12, further comprising instructions that cause said at least one processor to, between execution of said instructions that cause said at least one processor to query the database to identify the ready machine and execution of said instructions that cause said at least one processor to update the status for the ready machine in the database to indicate that said ready machine is in use, update the status for the ready machine in the database to indicate that said ready machine is in queue to be configured.

16. The computer-readable storage medium of claim 12, further comprising instructions that cause said at least one processor to provide said user a list of available configurations, each configuration comprising identifying a computer system and corresponding operating environment.

17. The computer-readable storage medium of claim 12, further comprising instructions that cause said at least one processor to:
  receive a plurality of other requests for machines; and
  for each of said other requests, updating a queue of machines needing configuration.

18. The computer-readable storage medium of claim 12, further comprising instructions that cause said at least one processor to associate, in the database, the request, the ready machine, and the selected target operating environment.

19. The computer-readable storage medium of claim 12, wherein said database is a relational database and wherein said records are rows of tables of said relational database.

20. The computer-readable storage medium of claim 12, wherein, for each machine of said plurality of machines, the information relating to a hardware configuration and status of the machine is stored in a row of one of said tables.

* * * * *